(12) United States Patent
Itoh et al.

(10) Patent No.: US 8,920,872 B2
(45) Date of Patent: Dec. 30, 2014

(54) METHOD OF PRODUCING A MAGNETIC RECORDING DISC

(75) Inventors: Kae Itoh, Tokyo (JP); Katsushi Hamakubo, Tokyo (JP); Koichi Shimokawa, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/166,056

(22) Filed: Jun. 22, 2011

(65) Prior Publication Data

US 2012/0225217 A1  Sep. 6, 2012

(30) Foreign Application Priority Data

Jun. 22, 2010  (JP) .................. 2010-141845

(51) Int. Cl.
*B05D 5/12* (2006.01)
*G11B 5/84* (2006.01)
*G11B 5/82* (2006.01)

(52) U.S. Cl.
CPC ................ *G11B 5/8408* (2013.01); *G11B 5/82* (2013.01)
USPC ...................................................... 427/127

(58) Field of Classification Search
CPC ............ G11B 5/84; G11B 5/725; G11B 5/71; G11B 5/8408; G11B 5/82
USPC .......................................... 427/127–132, 558
See application file for complete search history.

(56) References Cited

U.S. PATENT DOCUMENTS

| | | | | |
|---|---|---|---|---|
| 4,729,924 A | * | 3/1988 | Skorjanec et al. | 428/422 |
| 5,032,545 A | * | 7/1991 | Doan et al. | 438/762 |
| 5,656,349 A | * | 8/1997 | Gomi et al. | 428/848.2 |
| 6,099,762 A | * | 8/2000 | Lewis | 264/1.33 |
| 6,816,341 B2 | * | 11/2004 | Matsumoto et al. | 360/135 |
| 7,252,897 B2 | * | 8/2007 | Shimokawa et al. | 428/833 |
| 2002/0192391 A1 | * | 12/2002 | Wada et al. | 427/508 |
| 2009/0023017 A1 | * | 1/2009 | Tomiyasu et al. | 428/833.3 |
| 2010/0028721 A1 | * | 2/2010 | Hamakubo et al. | 428/848 |

FOREIGN PATENT DOCUMENTS

| | | | |
|---|---|---|---|
| JP | S62-66417 | 3/1987 | |
| JP | H11-025452 | 1/1999 | |
| JP | 2000311332 | * 12/1999 | ............... 428/848.2 |
| JP | 2000-311332 | 11/2000 | |
| JP | 2002-74648 | 3/2002 | |
| JP | 2004-103074 | 4/2004 | |
| JP | 2009-266360 | 3/2009 | |
| WO | WO 2007083792 A1 | * 7/2007 | |

OTHER PUBLICATIONS

English Abstract of JP2000311332.*
Japanese Office Action received Jun. 17, 2014 from related Japanese Application Serial No. 2010-141845, 5 pages.

* cited by examiner

*Primary Examiner* — Michael Wieczorek
*Assistant Examiner* — Sarah R Anderson

(57) ABSTRACT

A method of manufacturing a magnetic disk in which at least a magnetic layer, a carbon protective layer, and a lubrication layer are sequentially formed on a substrate is provided. The method comprises forming a film of a lubricant composition on the protective layer, the lubricant comprising a lubricant compound having a perfluoropolyether main chain in the molecular structure and an aromatic group or a phosphazene ring. The method further comprises forming the lubrication layer, and subjecting the magnetic disk to ultraviolet irradiation under a nitrogen gas or an inert gas atmosphere having an oxygen concentration of 5 volume % or less by adjusting an atmospheric temperature to a range of 50 to 180° C.

6 Claims, No Drawings

US 8,920,872 B2

METHOD OF PRODUCING A MAGNETIC RECORDING DISC

BACKGROUND OF THE INVENTION

1. Field of the Invention

The present invention relates to a manufacturing method of a magnetic disk to be mounted on a magnetic disk device such as a hard-disk drive (hereinafter abbreviated as HDD).

2. Description of Related Art

With the recent trend to higher-capacity information processing, various information recording technologies have been developed. Particularly, a surface recording density of an HDD using the magnetic recording technology has continuously increased by the rate of approximately 100% a year. In recent years, an information recording capacity exceeding 250 GB per disk is required for a magnetic disk having a diameter of 2.5 inches to be mounted on a magnetic disk device such as an HDD or the like, and in order to meet such demand, realization of an information recording density exceeding 400 Gbits per 1 square inch is in demand. In order to achieve the high recording density in a magnetic disk used in a magnetic disk device such as an HDD or the like, magnetic crystal grains constituting a magnetic recording layer handling of an information signal need to be refined, and its layer thickness needs to be reduced at the same time. However, in the case of a magnetic disk of an in-plane magnetic recording method (also referred to as longitudinal magnetic recording method or horizontal magnetic recording method) which has been merchandized, as the result of development of the refining of the magnetic crystal grains, a thermal fluctuation phenomenon in which thermal stability of the recording signal is damaged by a superparamagnetic phenomenon and the recording signal is lost begins to occur, which makes an obstructive factor to higher recording density of a magnetic disk.

In order to solve this obstructive factor, a magnetic recording medium for a perpendicular magnetic recording method has been proposed recently. In the case of the perpendicular magnetic recording method, unlike the in-plane magnetic recording method, an easy axis of magnetization of a magnetic recording layer is adjusted to be oriented in the perpendicular direction with respect to a substrate surface. As compared with the in-plane recording method, the perpendicular magnetic recording method can suppress the thermal fluctuation phenomenon, and this is suitable for higher recording density. This type of perpendicular magnetic recording mediums include a so-called two-layer type perpendicular magnetic recording disk provided with a soft magnetic underlayer made of a soft magnetic body on a substrate and a perpendicular magnetic recording layer made of a hard magnetic body as described in Japanese Unexamined Patent Application Publication No. 2002-74648, for example.

In a prior-art magnetic disk, a protective layer (a carbon protective layer in general) and a lubrication layer are provided on a magnetic recording layer formed on a substrate in order to ensure durability and reliability of the magnetic disk. Particularly, the lubrication layer used on the outermost surface requires various characteristics such as long-term stability, heat resistant property, chemical substance resistance, friction property and the like.

In order to accommodate such request, a perfluoropolyether lubricant having a hydroxyl group in the molecule has been widely used as a lubricant for a magnetic disk. For example, as in Japanese Patent Laid-Open No. 62-66417 (Patent Document 1), a magnetic recording medium in which a perfluoroalkylpolyether lubricant having a structure of $HOCH_2CF_2O(C_2F_4O)_p(CF_2O)_qCF_2CH_2OH$ having a hydroxyl group at both ends of the molecule is applied is well known. It is known that if the molecule of a lubricant has a hydroxyl group in itself, it is known that adhesion properties of the lubricant to the protective layer can be obtained by means of an interaction between the carbon protective layer and the hydroxyl group.

CITATION LIST

Patent Literature

Patent Document 1: Japanese Unexamined Patent Application Publication No. 62-66417
Patent Document 2: Japanese Unexamined Patent Application Publication No. 2000-311332

SUMMARY

As described above, the information recording density of 400 Gbit/inch$^2$ or more has been required for the recent HDD, but in order to effectively use a limited disk area, an LUL (Load Unload) type has begun to be used instead of the prior-art CSS (Contact Start and Stop) method in a start/stop mechanism of the HDD. In the LUL method, when an HDD is stopped, a magnetic head is retreated onto an inclined base called a ramp located outside the magnetic disk and in a start operation, after the magnetic disk starts rotating, the magnetic head is made to slide from the ramp onto the magnetic disk, floated and flown for recording and reproducing. In a stop operation, the magnetic head is retreated to the ramp outside the magnetic disk and then, the rotation of the magnetic disk is stopped. This series of operations are called LUL operations. In a magnetic disk to be mounted on the LUL-method HDD, a contact sliding region (CSS region) with the magnetic head as in the CSS method does not have to be provided, and thus, a recording and reproducing area can be expanded, which is preferable for a higher information capacity.

In order to improve the information recording density under these circumstances, a spacing loss needs to be reduced as much as possible by reducing a floating amount of the magnetic head. In order to achieve the information recording density of 400 Gbits or more per 1 square inch, the floating amount of the magnetic head needs to be at least 5 nm or less. In the LUL method, unlike the CSS method, a projection and recess shape for the CSS does not have to be provided on the magnetic disk surface, whereby the magnetic disk surface can be extremely smoothened. Thus, in the magnetic disk to be mounted on the LUL method HDD, the magnetic-head floating amount can be further lowered as compared with the CSS method, whereby a higher S/N ratio of the recording signal can be realized, and contribution can be made to a higher recording capacity of a magnetic disk device, which is an advantage.

Due to the further decrease of the magnetic-head floating amount promoted by recent introduction of the LUL method, a stable operation of the magnetic disk even with a low floating amount not more than 5 nm is in demand at the present. Particularly, as described above, the recording method of the magnetic disk has been changing from the in-plane magnetic recording method to the perpendicular magnetic recording method, and an increase in the capacity of a magnetic disk and a decrease in a flying height in compliance with that are in strong demand.

Also, in recent years, the magnetic disk devices are widely used not only as a storage device of a conventional personal computer but in mobile applications including a mobile phone, a car-navigation system and the like, and due to diversification of use applications, environmental resistances required for the magnetic disk has been extremely severe. Therefore, in view of these situations, further improvement of durability and reliability of the magnetic disk is more imminent than ever.

Also, with the recent rapid improvement of the information recording density of the magnetic disk, further reduction of a magnetic spacing between the magnetic head and the recording layers of the magnetic disk is in demand in addition to the decrease of the floating amount of the magnetic head, and a lubrication layer located between the magnetic head and the recording layer of the magnetic disk needs to be further thinned. A lubricant used for the lubrication layer on the outermost surface of the magnetic disk has a large influence on durability of the magnetic disk, but even if it is made into a thin film, stability and reliability are indispensable for the magnetic disk.

Hitherto, due to presence of a polar group such as the hydroxyl group in the molecule of the lubricant, favorable adhesion properties of the lubricant to the protective layer can be obtained by the interaction between a carbon protective layer and the hydroxyl group in the lubricant molecule, and thus particularly a perfluoropolyether lubricant having hydroxyl groups at the both ends in the molecule has been favorably used.

However, in the prior-art lubricant having the polar groups such as a plurality of hydroxyl groups in the molecule and high polarity, due to interaction between the molecules or attraction between the polar groups, the lubricant can easily cohere. The lubricant molecules having cohered as above are bulky, and a lubrication layer having a uniform film thickness cannot be easily obtained unless the film thickness is set relatively large, and there is a problem that reduction of the magnetic spacing cannot be achieved with that. Also, the polar groups which are excessive for the active point on the protective layer tend to induce contamination or the like and to cause transfer of the lubricant to the head, which causes a failure in the HDD.

Also, since a floating amount of the magnetic head has been further lowered due to the recent increase in the recording density, it has become highly likely that contact or friction between the magnetic head and the magnetic disk surface frequents. Also, if the magnetic head is brought into contact, it is likely that the magnetic head does not leave the magnetic disk surface soon but slides in friction for some time. A slider of the magnetic head used at present contains alumina ($Al_2O_3$), and it is known that the $CF_2O$ portion in the main chain of the perfluoropolyether lubricant can be easily decomposed by Lewis acid of alumina and the like. Thus, in the perfluoropolyether lubricant used on the surface of the magnetic disk, the $CF_2O$ portion in the main chain is decomposed by alumina due to the contact with the magnetic head or the like, and the lubricant constituting the lubrication layer can become lower molecules more easily than before. It is concerned that adhesion of the lubricant which has been decomposed and become lower molecules to the magnetic head might interfere with reading or writing of data. Moreover, considering data recording and reproduction in the near future in the state in which the magnetic head is in contact with the magnetic disk, the influence caused by contact all the time is further concerned. Also, if the molecules of the lubricant constituting the lubrication layer become lower molecules, lubrication properties are lost. The lubricant having lost the lubrication properties transfers to and accumulates on the magnetic head in an extremely narrow positional relationship, and as a result, a floating attitude becomes unstable, which is considered to cause a fly stiction failure.

Also, in the current magnetic disk, provision of a magnetic disk provided with a lubrication layer having excellent heat resistance that can prevent the fly stiction failure or corrosion failure even with the extremely low floating amount of 5 nm or less, for example, or a magnetic disk provided with a lubrication layer having favorable temperature characteristics and demonstrating a stable operation under a wide range of temperature conditions is in demand, and particularly, improvement of the heat resistance of the lubricant used in the lubrication layer is imperative.

For example, by using a material having heat resistance such as a prior-art phosphazene compound disclosed in the above-described Patent Document 2 and the like, the heat resistant temperature of the lubricant can be raised to approximately 300° C. at the maximum, for example, and the heat resistance required for the lubrication layer of the magnetic disk can be improved better than before.

However, if the lubrication layer is formed by using the lubricant containing the phosphazene compound, there is a problem in which adhesion with the carbon protective layer affecting durability of the magnetic disk cannot be sufficiently obtained.

As described above, since realization of a magnetic disk excellent in long-term stability of the lubrication layer and having high reliability under the circumstances of reduction of magnetic spacing involved in the recent increase in the recording density and the extremely lower floating amount of the magnetic head is in demand, and moreover, due to diversification of use applications, environmental resistance required for the magnetic disk has become extremely severe and thus, further improvement in durability of the magnetic disk or particularly in the characteristics such as glide properties and LUL durability in addition to reduction in the film thickness of the lubrication layer is in demand more than ever.

The present invention was made in view of the above-described prior-art circumstances and has an object to provide a manufacturing method of a magnetic disk, which can realize further reduction of the magnetic spacing, has excellent durability or particularly excellent glide properties and LUL durability, and is provided with and high reliability under the circumstances of an extremely low floating amount of the magnetic head involved in the recent rapid increase of recording density and extremely severe environmental resistance involved in diversification of use applications.

The inventor has found out that the above-described problems can be solved by the following invention as the result of keen examination on improvement of adhesion between the lubricant and the protective layer which greatly affects durability of the magnetic disk and completed the present invention.

That is, the present invention has the following configuration:

(Composition 1)

A manufacturing method of a magnetic disk in which at least a magnetic layer, a carbon protective layer, and a lubrication layer are sequentially formed on a substrate, characterized in that a film of a lubricant composition including a lubricant compound having a perfluoropolyether main chain in the molecular structure and also an aromatic group or a phosphazene ring is formed on the protective layer and the lubrication layer is formed and then, the magnetic disk is subjected to ultraviolet irradiation under a nitrogen gas or an inert gas atmosphere having oxygen concentration of 5 volume % or less by adjusting an atmospheric temperature to a range of 50 to 180° C.

(Composition 2)

The manufacturing method of a magnetic disk described in the composition 1, characterized in that the atmospheric temperature in ultraviolet irradiation is within a range of 90 to 140° C.

(Composition 3)

The manufacturing method of a magnetic disk described in the composition 1 or 2, characterized in that a light source used for the ultraviolet irradiation includes a wavelength region at least in the vicinity of 185 nm.

(Composition 4)

The manufacturing method of a magnetic disk described in any one of the compositions 1 to 3, characterized in that a predetermined space region which contains the magnetic disk to be subjected to the ultraviolet irradiation is covered by a housing which is formed, at least on the ultraviolet irradiation side, of a transparent member transmitting the ultraviolet rays and while the nitrogen gas or the inert gas is made to flow into the housing, the magnetic disk in the housing is subjected to the ultraviolet irradiation from the outside of the housing.

(Composition 5)

The manufacturing method of a magnetic disk described in any one of the compositions 1 to 4, characterized in that the lubricant compound is a compound having a polar group as well as the aromatic group or the phosphazene ring.

(Composition 6)

The manufacturing method of a magnetic disk described in any one of the compositions 1 to 5, characterized in that the protective layer is a film of a carbon protective layer formed by a plasma CVD method.

(Composition 7)

The manufacturing method of a magnetic disk described in any one of the compositions 1 to 6, characterized in that the magnetic disk is a perpendicular magnetic recording disk mounted on a magnetic disk device whose start/stop mechanism is of a load-unload type.

As described in the composition 1, the present invention is a manufacturing method of a magnetic disk in which at least a magnetic layer, a carbon protective layer, and a lubrication layer are sequentially formed on a substrate, characterized in that a film of a lubricant composition containing a specific lubricant compound is formed on the carbon protective layer and the lubrication layer is formed and then, the magnetic disk is subjected to ultraviolet irradiation under a nitrogen gas or an inert gas atmosphere having oxygen concentration of 5 volume % or less by adjusting an atmospheric temperature to a range of 50 to 180° C.

The lubricant compound used in the present invention is a compound having a perfluoropolyether main chain in the molecular structure and also having an aromatic group or a phosphazene ring. If a film of such a lubricant compound is formed on the carbon protective layer of the magnetic disk, the aromatic group or the phosphazene ring in the lubricant molecule and the protective layer get close by $\pi$-$\pi$ interaction, and the lubricant is adsorbed to the protective layer by the interaction. When being applied on the disk surface, the lubricant molecule is fixed to the protective layer at a position where the aromatic group or the phosphazene ring is introduced, and the center part of the lubricant molecule can be located stably on the medium in a flatter state, and a thin lubrication layer in which bulkiness of the molecule is suppressed can be formed on the protective layer. Moreover, even if the film thickness of the lubrication layer is reduced, a lubrication layer (with high coverage rate) that can sufficiently cover the protective layer surface can be formed.

In the present invention, a film of such lubricant composition containing lubricant compound containing an aromatic group or a phosphazene ring in the molecule is formed on the carbon protective layer and the lubrication layer is formed and then, the magnetic disk is subjected to ultraviolet irradiation under a nitrogen gas or an inert gas atmosphere having oxygen concentration of 5 volume % or less by adjusting an atmospheric temperature to a range of 50 to 180° C. so that a bonding reaction occurs between the lubricant and a carbon in the carbon protective layer, and chemical bonding between the aromatic group and the periphery of the aromatic group in the lubricant molecule to the protective layer or chemical bonding of the phosphazene ring and the periphery of the phosphazene ring in the lubricant molecule to the protective layer can be made firmer, and an adhesion force of the film-formed lubrication layer to the protective layer can be further improved.

That is, according to the present invention, since a lubrication layer which is extremely excellent in adhesion to the protective layer can be formed, a magnetic disk having high reliability under the circumstances of the extremely low floating amount (5 nm or less) of the magnetic head involved in the recent rapid increase in the recording density or under the extremely severe environmental resistance involved in diversification of use applications can be obtained.

Also, as described in the composition 2, in order that the working effects of the present invention are exerted more preferably, the atmospheric temperature at the ultraviolet irradiation is particularly preferably within the range of 90 to 140° C.

Also, as described in the composition 3, the light source used for the ultraviolet irradiation preferably includes a wavelength region in the vicinity of at least 185 nm, which is preferable for a bonding reaction (reaction efficiency is high) between the lubricant compound and the carbon in the carbon protective layer by the ultraviolet irradiation.

Also, in the present invention, as described in the composition 4, it is preferable that a predetermined space region which contains the magnetic disk to be subjected to the ultraviolet irradiation is covered at least on the ultraviolet irradiation side by a housing formed of a transparent member which transmits the ultraviolet rays and while the nitrogen gas or the inert gas is made to flow into the housing, the magnetic disk in the housing is subjected to the ultraviolet irradiation from the outside of the housing. In such a mode, by selecting the predetermined space region with the required minimum size that does not cause nonconformity in ultraviolet irradiation to the magnetic disk, the atmosphere in which the ultraviolet irradiation is applied to the magnetic disk can be made a nitrogen gas or inert gas atmosphere having the oxygen concentration of 5 volume % or less and the atmospheric temperature can be easily adjusted to the range of 50 to 180° C. Also, a usage of the nitrogen gas or the inert gas can be saved.

Also, as described in the composition 5, the lubricant compound used in the present invention is preferably a compound having a polar group as well as the aromatic group or the phosphazene ring. As such a polar group, a hydroxyl group is preferable, for example. The hydroxyl group has large interaction with the carbon protective layer, and adhesion by the interaction between the hydroxyl group and the carbon protective layer can be obtained in addition to the interaction between the above-described aromatic group or the phosphazene ring and the carbon compound.

Also, as described in the composition 6, the lubricant compound is particularly preferably a film of a carbon protective layer formed by a plasma CVD method. That is because, with the plasma CVD method, the carbon protective layer in which the surface is uniform and the film is formed closely can be formed, which is preferable for the present invention.

Also, as described in the composition 7, the magnetic disk of the present invention is suitable particularly as a magnetic disk mounted on a magnetic disk device whose start/stop mechanism is of a load-unload type. With further reduction in the magnetic head floating amount involved in introduction of the LUL method, the magnetic disk is required to stably operate even under the extremely low floating amount of 5 nm or less, and the magnetic disk of the present invention having high reliability even under such an extremely low floating amount is preferable.

Advantages of the Invention

According to the present invention, further reduction of the magnetic spacing can be realized and moreover, a manufacturing method of a magnetic disk excellent in durability of the magnetic disk or particularly in the glide characteristics and LUL durability and having high reliability under the circumstances of the extremely low floating amount of the magnetic head involved in the recent rapid increase in the recording density and under the extremely severe environmental resistance involved in diversification of use applications can be provided.

DESCRIPTION OF THE PREFERRED EMBODIMENTS

The present invention will be described below in detail by using an embodiment.

The present invention is a manufacturing method of a magnetic disk in which at least a magnetic layer, a carbon protective layer, and a lubrication layer are sequentially formed on a substrate and is a manufacturing method of a magnetic disk, characterized in that a film of a lubricant composition containing a lubricant compound having a perfluoropolyether main chain in the molecular structure and also an aromatic group or a phosphazene ring is formed on the protective layer and the lubrication layer is formed and then, the magnetic disk is subjected to ultraviolet irradiation under a nitrogen gas or an inert gas atmosphere having oxygen concentration of 5 volume % or less by adjusting an atmospheric temperature to a range of 50 to 180° C.

The lubricant compound used for forming the lubrication layer of the present invention has a perfluoropolyether main chain in the molecular structure and also has an aromatic group or a phosphazene ring. For such a lubricant compound, it is preferable particularly to apply ultraviolet irradiation to the lubrication layer of the magnetic disk after film formation in order to further improve the adhesion force of the film-formed lubrication layer to the carbon protective layer. Since the lubricant compound efficiently bonds to the active point (adsorption point) of the carbon on the carbon protective layer by the ultraviolet irradiation, the adhesion characteristics (close contact) between the carbon protective layer and the lubrication layer can be further improved.

Regarding the lubricant compound used in the present invention, the chemical structure thereof is not particularly limited as long as it has the perfluoropolyether main chain in the molecular structure and also has the aromatic group or the phosphazene ring.

As the aromatic group in this case, a phenyl group, for example, is cited as the most preferable typical example and also, a naphthylene group, a biphenylene group, a phthalimidyl group, an aniline group and the like can be cited. The number of aromatic groups is not limited to one in a molecule but may be plural (two groups, for example). The aromatic group may have an appropriate substituent group.

If a film of such a perfluoropolyether lubricant compound having an aromatic group, for example, is formed on the carbon protective layer of the magnetic disk, the aromatic group in the lubricant molecule and the protective layer get close by π-π interaction, and the lubricant is considered to be adsorbed to the protective layer by the interaction. Particularly, it is preferable that the aromatic group is introduced to a position other than the both ends of the lubricant molecule and it is preferable that the aromatic group is introduced at a position substantially at the center of the main chain of a linear lubricant molecule or at two positions dividing the main chain of the linear lubricant molecule into substantially equal three parts, for example. When being applied on the disk surface, the lubricant molecule is fixed to the protective layer at the position where the aromatic group is introduced, and the center part of the lubricant molecule can be stably located on the medium in a flatter state, whereby a thin lubrication layer in which bulkiness of the molecule is suppressed can be formed on the protective layer. Moreover, even if the film thickness of the lubrication layer is reduced, a lubrication layer (with high coverage rate) that can sufficiently cover the protective layer surface can be formed.

Also, the lubricant compound used in the present invention is preferably a compound further having a polar group in addition to the aromatic group or the phosphazene ring. Particularly if the compound has an aromatic group, for example, at a position other than the both ends of the above-described lubricant molecule, it preferably has a polar group at the positions of the both ends of the lubricant molecule. As such a polar group, a hydroxyl group (—OH), an amino group (—NH$_2$), a carboxyl group (—COOH), an aldehyde group (—COH), a carbonyl group (—CO—), a sulfonic acid group (—SO$_3$H) and the like can be cited, for example. Among them, the hydroxyl group is preferable, for example. The hydroxyl group has large interaction with the carbon protective layer, and adhesion by the interaction between the hydroxyl group and the carbon protective layer can be obtained in addition to the interaction between the above-described aromatic group or the phosphazene ring and the carbon compound.

The lubricant compounds, each having the above-described aromatic group used in the present invention, are exemplified below, but it is needless to say that the present invention is not limited to these compounds:

[Chemical formula 1]

Exemplified compound No. 1

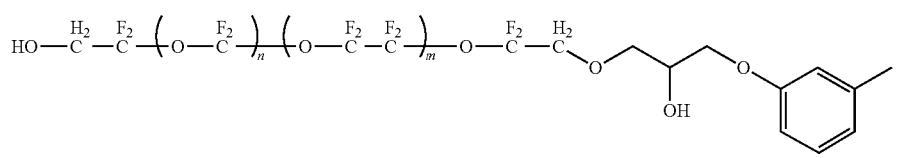

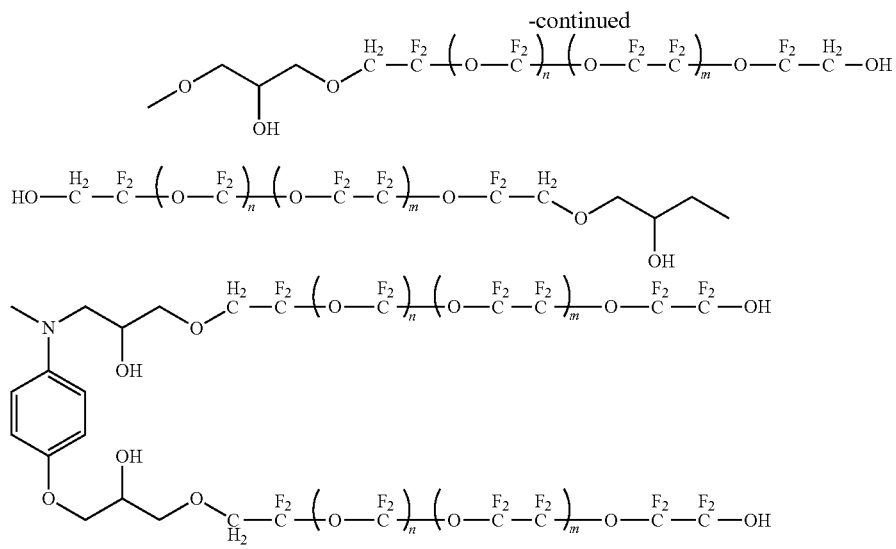

No. 2

[Chemical formula 2]

Exemplified compound No. 3

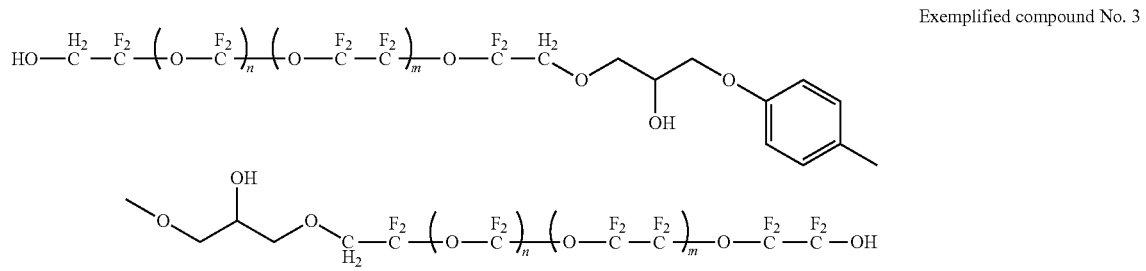

[Chemical formula 3]

Exemplified compound No. 4

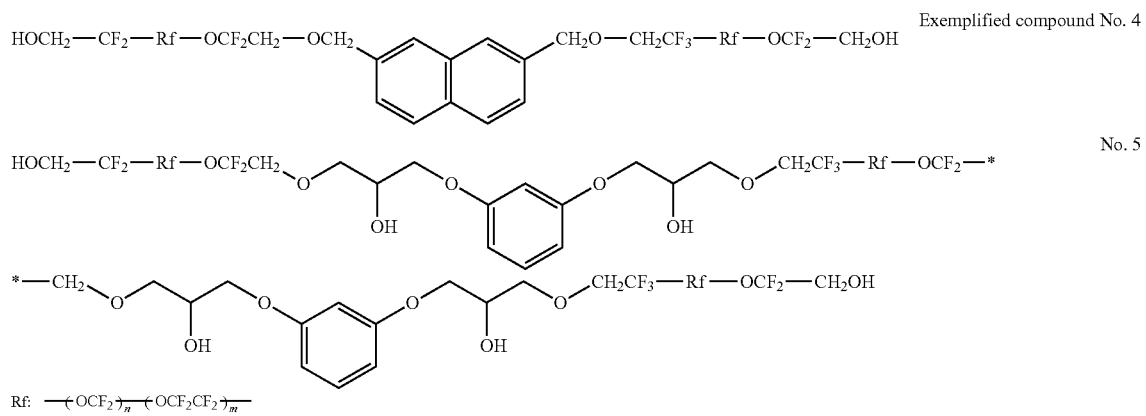

No. 5

Rf: —(OCF$_2$)$_n$—(OCF$_2$CF$_2$)$_m$—

However, in the chemical expressions expressing the exemplified lubricant compounds, reference characters m and n represent integers not less than 1, respectively.

As the manufacturing method of the lubricant compound having the above-described aromatic group used in the present invention, a manufacturing method in which, with regard to the lubricant compound of the above exemplified No. 1, for example, a compound having an epoxy group and an aromatic group (resorcinol diglycidylether, for example), for example, is reacted with a perfluoroether compound having a perfluoropolyether main chain in the molecule under an alkaline condition is preferably cited. The other exemplified compounds can be also obtained by the similar manufacturing method.

Also, as the perfluoropolyether lubricant compound having the phosphazene ring used in the present invention, a compound in which the perfluoropolyether groups, each having the perfluoropolyether main chain in the structure and the phosphazene ring at the end, bond with each other through a divalent aliphatic group, for example, is cited. The divalent aliphatic group is a group having a group indicated by —(CR$_1$R$_2$)— in the main chain, for example. Here, reference characters R$_1$ and R$_2$ are hydrogen atoms or hydroxyl groups, respectively.

Exemplified compound of the lubricant compound having the phosphazene ring used in the present invention is cited below, but the present invention is not limited to these compounds.

[Chemical expression 4]

Exemplified compound A

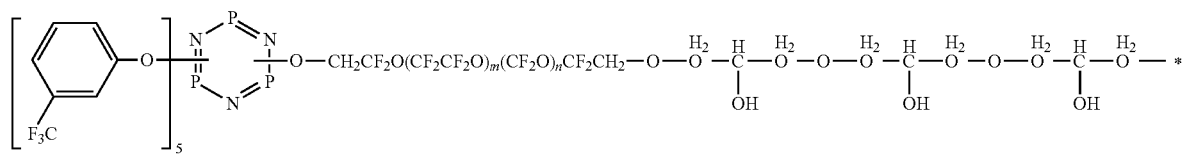

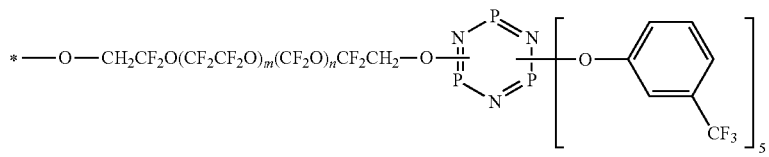

As the manufacturing method of the lubricant compound, a manufacturing method in which 2 equivalent of the perfluoropolyether compound having the perfluoropolyether main chain in the molecule and the phosphazene ring at the end is reacted with 1 equivalent of the aliphatic compound having a structure that can be reacted with the perfluoropolyether compound is preferably cited, for example. As the aliphatic compound, an epoxy compound having an epoxydo structure at the end is preferably cited, for example.

Also, as the other perfluoropolyether lubricant compound having a phosphazene ring, a compound in which the perfluoropolyether groups, each having the perfluoropolyether main chain in the structure and the phosphazene ring at the end, bond with each other through the phosphazene ring is cited. The compound is exemplified below, but the present invention is not limited to these compounds.

Also, the above exemplified compound is a dimer compound in which perfluoropolyether groups, each having the perfluoropolyether main chain in the structure and the phosphazene ring at the end, bond with each other through the phosphazene ring, but this is not limiting, and the compound may be a multimer compound in which a trimer or more of the perfluoropolyether groups bond together through the phosphazene ring. As the manufacturing method of such trimer or multimer compound, a manufacturing method of a trimer in which 2 equivalent of the perfluoropolyether compound having the perfluoropolyether main chain in the molecule and a hydroxyl group at the both ends is reacted with 1 equivalent of phenoxy 4-substitution of cyclophosphazene, and 1 equivalent of the obtained compound is reacted with phenoxy 5-substitution of cyclophosphazene, for example, is preferably cited.

[Chemical expression 5]

例示化合物B

Exemplified compound B

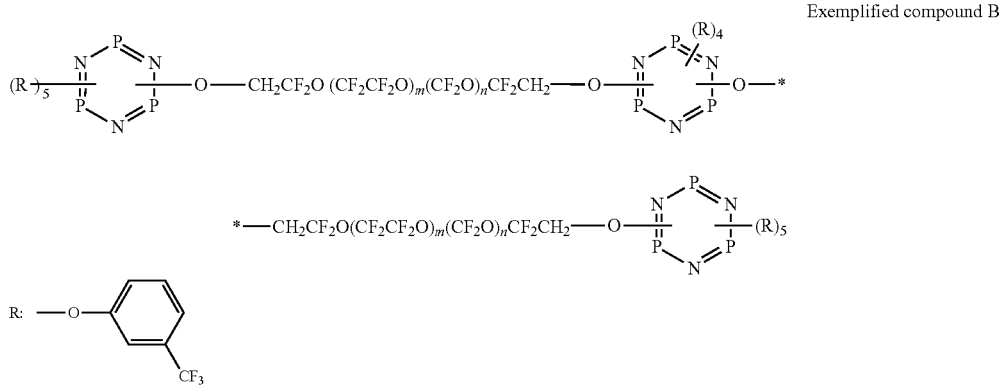

As the manufacturing method of the exemplified lubricant compounds, first, as a linking group portion, 4 equivalent of m-trifluoromethylphenol is made to act on a base and is reacted with 1 equivalent of phosphonitrilic chloride trimer so as to prepare phenoxy 4-substitution of cyclophosphazene, for example. After that, 2 equivalent of perfluoropolyether compound having the perfluoropolyether main chain in the molecule and the phosphazene ring at the end is reacted with 1 equivalent of phenoxy 4-substitution of cyclophosphazene so as to obtain the compound.

Also, a compound may be such that, similarly to the above exemplified compounds, the perfluoropolyether groups, each having the perfluoropolyether main chain in the structure and the phosphazene ring at the end, bond with each other through the phosphazene ring, but the compound may have a structure in which a plurality of the perfluoropolyether groups bond with a bond at a substitution position of one phosphazene ring. For example, the compound is exemplified below, but the present invention is not limited to these compounds.

[Chemical expression 6]

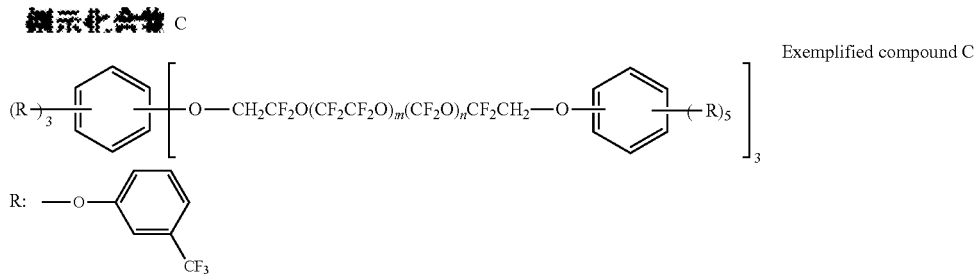

Exemplified compound C

As the manufacturing method of the above-described lubricant compound, a manufacturing method in which 3 equivalent of the perfluoropolyether compound having a perfluoropolyether main chain in the molecule and a phosphazene ring at the end is reacted with 1 equivalent of phenoxy 3-substitution of cyclophosphazene is preferably cited, for example.

The molecular weight of the lubricant compound used in the present invention is not particularly limited, but the number average molecular weight (Mn) is preferably within a range of 1000 to 10000, for example, and more preferably within a range of 1000 to 6000. That is because repairability by appropriate viscosity is provided, favorable lubrication performances are exerted, and moreover, excellent heat resistance is provided.

If the lubricant compound of the present invention used in the present invention is to be obtained by the above-described synthesizing method, the lubricant compound preferably has the number average molecular weight (Mn) within a range of 1000 to 10000, for example, by an appropriate molecular weight fractionation. The method of molecular weight fractionation is not particularly limited in this case, and molecular weight fractionation using a gel permeation chromatography (GPC) method or molecular weight fractionation using a supercritical extraction method can be used, for example.

The manufacturing method of a magnetic disk of the present invention is characterized in that a film of the lubricant composition containing a lubricant compound having a perfluoropolyether main chain in the molecular structure and also an aromatic group or a phosphazene ring is formed on the carbon protective layer and the lubrication layer is formed and then, the magnetic disk is subjected to ultraviolet irradiation under a nitrogen gas or an inert gas atmosphere having oxygen concentration of 5 volume % or less by adjusting an atmospheric temperature to a range of 50 to 180° C.

In forming the lubrication layer by using the lubricant compound according to the present invention, a film can be formed by application using a dip method, for example, using a solution in which the lubricant compound is dispersed and dissolved in a fluorine solvent or the like.

The forming method of the lubrication layer is naturally not limited to the above dip method but a film forming method such as a spin coating method, a spraying method, a paper coating method and the like may be used.

In the present invention, in order to further improve adhesion between the formed film of lubricant and the carbon protective layer, ultraviolet (UV) irradiation is applied to the magnetic disk after film formation. That is, in the present invention, as post treatment after the film formation of the lubrication layer, ultraviolet irradiation suitable for reinforcing the chemical bonding between the aromatic group and the periphery of the aromatic group in the lubricant molecule or the chemical bonding between the phosphazene ring and the periphery of the phosphazene ring in the lubricant is conducted to the carbon protective layer.

In the present invention, it is considered that if a film of such lubricant composition containing the lubricant compound having the aromatic group or the phosphazene ring in the molecule on the carbon protective layer, the aromatic group or the phosphazene ring in the lubricant molecule and the protective layer get close by π-π interaction, and the lubricant is adsorbed to the protective layer by the interaction. And by applying the ultraviolet irradiation to the magnetic disk after the lubrication layer is formed, a bonding reaction between radicals generated by cutting off the main chain at a position in the vicinity of the aromatic group or the phosphazene ring in the lubricant molecule and the active point (adsorption point) in the carbon on the carbon protective layer occurs. As a result, the chemical bonding between the aromatic group and the periphery of the aromatic group in the lubricant molecule to the carbon protective layer or the chemical bonding of the phosphazene ring and the periphery of the phosphazene ring in the lubricant molecule to the protective layer can be made firmer, and an adhesion force of the formed lubrication layer to the protective layer can be further improved.

In the present invention, if a film of the lubricant compound is formed on the carbon protective layer and the lubrication layer is formed and then the magnetic disk is subjected to ultraviolet irradiation, it is essential that the ultraviolet irradiation is conducted under a nitrogen gas or an inert gas atmosphere having oxygen concentration of 5 volume % or less and an atmospheric temperature adjusted to a range of 50 to 180° C.

That is, in the present invention, the atmosphere in which the ultraviolet irradiation is performed is a nitrogen gas or an inert gas atmosphere having oxygen concentration of 5 volume % or less. If ultraviolet irradiation is performed with oxygen present in the atmosphere, ozone is generated in reaction with the oxygen. Since the generated ozone decomposes the lubricant, it is preferable that oxygen is not present as much as possible in the atmosphere in which the ultraviolet irradiation is performed to the magnetic disk. Therefore, in the present invention, the oxygen concentration is set at 5 volume % or less or it is most preferable that oxygen does not exist in the atmosphere. Also, in the present invention, the atmospheric gas is preferably a nitrogen gas or an inert gas of argon, helium and the like.

Moreover, in the present invention, it is preferable that the atmospheric temperature when the ultraviolet irradiation is conducted to a range of 50 to 180° C. By adjusting the atmospheric temperature when the ultraviolet irradiation is conducted is adjusted to a range of 50 to 180° C., yields in the glide test and the LUL durability test of the manufactured magnetic disk can be raised as compared with the case outside the range, that is, when the temperature is less than 50° C. or higher than 180° C.

In the present invention, it is particularly preferable that the atmospheric temperature at the ultraviolet irradiation is within a range of 90 to 140° C.

Also, as a light source used for the ultraviolet irradiation, a low-pressure mercury lamp which emits light in the ultraviolet region, for example, can be used, but a wavelength region at least in the vicinity of 185 nm, which is preferable for efficient bonding reaction between the lubricant compound and carbon in the carbon protective layer by the ultraviolet irradiation (reaction efficiency is high) is preferably contained.

Also, as a specific embodiment of the method of applying ultraviolet irradiation to the magnetic disk according to the present invention, it is preferable that a predetermined space region which contains the magnetic disk to be subjected to the ultraviolet irradiation is covered by a housing formed, at least on the ultraviolet irradiation side, of a transparent member transmitting the ultraviolet rays and while the nitrogen gas or the inert gas is made to flow into the housing, the magnetic disk in the housing is subjected to the ultraviolet irradiation from the outside of the housing, for example. In such an embodiment, by selecting the predetermined space region with the required minimum size that does not cause nonconformity in ultraviolet irradiation to the magnetic disk, the atmosphere in which the ultraviolet irradiation is applied to the magnetic disk can be made a nitrogen gas or inert gas atmosphere having the oxygen concentration of 5 volume % or less and the atmospheric temperature can be easily adjusted to the range of 50 to 180° C. Also, it has an advantage that a usage of the nitrogen gas or the inert gas can be saved.

As described above, it is preferable, in the present invention, that a predetermined space region which contains the magnetic disk to be subjected to the ultraviolet irradiation is selected with the required minimum size that does not cause nonconformity in ultraviolet irradiation to the magnetic disk, and considering the case of the ultraviolet irradiation treatment sheet by sheet to a magnetic disk having the size of 2.5 inches, for example, the required predetermined space region can be 8000 $cm^3$ (corresponding to the size of 20 cm×20 cm×20 cm) or less, for example, preferably 4000 $cm^3$ or less, or more preferably 2500 $cm^3$. These sizes are only examples, and they are not limiting.

The housing which covers the predetermined space region which contains the magnetic disk to be subjected to such ultraviolet irradiation is formed, at least on the ultraviolet irradiation side, of a transparent member which transmits the ultraviolet rays, and as the transparent member in this case, a synthetic quartz or the like with high transparency in the ultraviolet region including a wavelength region at least the vicinity of 185 nm is preferable. Also, it is only necessary that this housing is formed, at least on the ultraviolet irradiation side, of a transparent member which transmits the ultraviolet rays, but it is needless to say that the whole of the housing may be formed of the transparent member. Also, the shape of this housing is not particularly limited, but a box shape, a dome shape or a spherical shape is usually preferable.

Also, if the ultraviolet irradiation is applied to the magnetic disk while the nitrogen gas or the inert gas is made to flow into the housing, it is preferable that a gas flow or the like is adjusted so that the inside of the housing becomes a positive pressure. By setting the gas pressure inside of the housing at a positive pressure, it is possible to reduce the oxygen concentration in the atmosphere in which the ultraviolet irradiation is applied to the magnetic disk as much as possible to 5 volume % or less. Also, the temperature of the atmosphere in which the ultraviolet irradiation is applied to the magnetic disk in the housing (atmosphere in the housing) is adjusted to the range or 50 to 180° C., but if the temperature needs to be raised, a heater can be used, for example, or to the contrary, if the temperature needs to be lowered, appropriate cooling means can be used or the flow-gas temperature can be lowered, and a method of adjusting the atmospheric temperature is arbitrary.

Also, time for the ultraviolet irradiation to the magnetic disk is, strictly speaking, time required for the bonding reaction between the lubricant compound and the carbon in the carbon protective layer to occur by the ultraviolet irradiation, but though depending on intensity of the light source or the like in usual, time within approximately 5 to 15 seconds is preferable.

The film thickness of the prior-art lubrication layer is usually about 13 to 15 Å, but in the present invention, the film thickness can be made smaller than before to approximately 7 to 12 Å, for example.

Also, as the carbon protective layer in the present invention, particularly an amorphous carbon protective layer is preferable. By using a carbon protective layer as the protective layer, if the lubricant compound further has a polar group (a hydroxyl group, for example) in addition to the interaction between the aromatic group or the phosphazene ring of the lubricant compound and the protective layer, the interaction between this polar group and the protective layer is improved, which is a preferable mode.

In the carbon protective layer in the present invention, from the viewpoint to further improve the interaction between the polar group of the lubricant compound and the protective layer, it is preferable that nitrogen is contained on the lubrication layer side of the protective layer, for example, so as to have a composition inclined layer containing hydrogen on the magnetic layer side. As a method of having the lubrication layer side of the protective layer contain nitrogen, a method of applying nitrogen plasma treatment to the surface after the film of the protective layer is formed and of casting a nitrogen ion or a method of forming a film of carbon nitride can be cited. Then, adhesion of the lubricant to the protective layer can be further improved.

A film of the carbon protective layer in the present invention can be formed by using a DC magnetron sputtering method, for example, but a of an amorphous carbon protective layer film-formed by the plasma CVD method is particularly preferable. By forming a film by the plasma CVD method, the surface of the protective layer is made uniform and densely formed. Therefore, formation of a lubrication layer according to the present invention on the protective layer film-formed by using the CVD method with smaller coarseness is preferable.

In the present invention, the film thickness of the protective layer is preferably 15 to 50 Å. If the thickness is less than 15 Å, performances as the protective layer might be lowered. The thickness exceeding 50 Å is not preferable from the viewpoint of film thinning.

In the magnetic disk of the present invention, the substrate is preferably a glass substrate. A glass substrate is rigid and is excellent in smoothness, which is preferable for higher recording density. As the glass substrate, an aluminosilicate glass substrate, for example, can be cited, and particularly a chemically-reinforced aluminosilicate glass substrate is preferable.

In the present invention, regarding coarseness of the main surface of the above substrate, the surface is preferably supersmooth with Rmax at 3 nm or less and Ra at 0.3 nm or less. The surface coarseness Rmax and Ra here are based on the specification by JIS B0601.

The magnetic disk obtained by the present invention is provided at least with a magnetic layer, a protective layer, and a lubrication layer on the substrate, but as the magnetic layer, the perpendicular recording type magnetic layer is preferable for realization of the recent rapid increase in recording density. Particularly, a CoPt magnetic layer is preferable since it can obtain both a high magnetic coercive force and a high reproduction output.

In the preferable perpendicular magnetic recording disk of the magnetic disk of the present invention, an underlayer can be provided between the substrate and the magnetic layer as necessary. Also, an adhesion layer or a soft magnetic layer or the like may be provided between the underlayer and the substrate. In this case, as the underlayer, a Cr layer, a Ta layer, a Ru layer or an alloy layer of CrMo, CoW, CrW, CrV, CrTi and the like can be cited, for example, and as the adhesion layer, an alloy layer of CrTi, NiAl, AlRu and the like can be cited, for example. Also, as the soft magnetic layer, a CoZrTa alloy film, for example, can be cited.

As the perpendicular magnetic recording disk preferable for increase in the recording density, a configuration provided with an adhesion layer, a soft magnetic layer, an underlayer, a magnetic layer (perpendicular magnetic recording layer), a carbon protective layer, and a lubrication layer on the substrate is preferable. In this case, it is also preferable that a supplementary recording layer is provided through an exchange coupling control layer on the perpendicular magnetic recording layer.

As described above, according to the manufacturing method of a magnetic disk according to the present invention, since a lubrication layer which is extremely excellent in adhesion to the protective layer can be formed, a magnetic disk having high reliability under the circumstances of the extremely low floating amount (5 nm or less) of the magnetic head involved in the recent rapid increase in the recording density or under the extremely severe environmental resistance involved in diversification of use applications can be obtained.

The magnetic disk obtained by the present invention is preferable as a magnetic disk mounted particularly on an LUL-type magnetic disk device. A further decrease of the magnetic-head floating amount realized by introduction of the LUL method has required the magnetic disk to operate stably even with an extremely low floating amount of not more than 5 nm, for example, and the magnetic disk of the present invention having high reliability under the circumstance of the extremely low floating amount is preferable.

EXAMPLES

The present invention will be described below in more detail by referring to examples. Comparative examples to the examples will be also described.

Example 1

Comparative Example 1

The magnetic disk according to this example is formed with an adhesion layer, a soft magnetic layer, a first underlayer, a second underlayer, a magnetic layer, a carbon protective layer, and a lubrication layer sequentially formed on the substrate.

(Manufacture of the Lubricant)

The lubricant compound in the above exemplification No. 1 was manufactured as follows.

The lubricant compound was manufactured by reacting the perfluoropolyether compound having a perfluoropolyether main chain in the molecule and having a hydroxyl group at the both ends with resorcinol diglycidylether under the alkaline condition (NaOH).

With respect to the lubricant made of the compound obtained as above, molecular weight fractionation was conducted as appropriate by means of the supercritical extraction method.

(Manufacture of magnetic disk)

A 2.5-inch glass disk (outer diameter of 65 mm, inner diameter of 20 mm, and disk thickness of 0.635 mm) made of chemically reinforced aluminosilicate glass was prepared and used as a disk substrate. The main surface of the disk substrate was minor-polished so as to have R max of 2.13 nm and Ra of 0.20 nm.

On this disk substrate, films of a Ti adhesion layer, a Fe soft magnetic layer, a Ru first underlayer, similarly a Ru second underlayer, and a CoCrPt magnetic layer were formed sequentially in an Ar gas atmosphere by the DC magnetron sputtering method. This magnetic layer was a perpendicular magnetic recording type magnetic layer.

Subsequently, a film of a diamond-like carbon protective layer was formed with the film thickness of 50 Å by the plasma CVD method.

Subsequently, a lubrication layer was formed as follows.

A solution was prepared in which the lubricant (with Mn measured by using the NMR method of 2800 and the molecular weight dispersion degree of 1.10) made of the lubricant compound (the above exemplified compound No. 1) obtained by molecular weight fractionation through the supercritical extraction method was dispersed and dissolved with the concentration of 0.2 weight % in the fluorine solvent, Vertrel XF (product name) by DU PONT-MITSUI FLUOROCHEMICALS COMPANY, LTD. By using this solution as an application liquid, the magnetic disk on which films were formed up to the protective layer was immersed and the liquid was applied by the dip method, and a film of the lubrication layer was formed.

After the film formation, the magnetic disk was installed in the housing having a box shape. This housing has a box shape of approximately 13 cm each and the entirety is formed of synthetic quartz glass, and a gas inlet and a gas outlet are provided. While the nitrogen gas is made to flow into this housing through the gas inlet, by using a light source installed outside this housing, ultraviolet irradiation was conducted to the magnetic disk in the housing.

As the light source, a low-pressure mercury lamp (110 W) having light intensity ratio of wavelength 185 nm:wavelength 254 nm=3:10 was used. Also, while the nitrogen gas is made to flow into the housing as described above, the housing was ventilated through the outlet and the nitrogen gas flow was adjusted so that the gas pressure in the housing becomes a positive pressure. Then, the inside of the housing was almost replaced by the nitrogen gas and the oxygen concentration was 5 volume % or less. Also, the atmospheric temperature inside the housing during the ultraviolet irradiation was adjusted to the range of 50 to 90° C. (50° C. or more and less than 90° C.). This temperature adjustment was performed as appropriate by heating the installation base of the magnetic disk using a heater or cooling of the inflow nitrogen gas or the like.

As described above, the ultraviolet irradiation was conducted for 10 seconds to the magnetic disk installed in the housing. The film thickness of the lubrication layer after the ultraviolet irradiation was measured by a Fourier transform infrared spectrophotometer (FTIR), and the result was 12 Å. The lubrication layer coverage rate was 80% or more, which is also preferable. 100 pieces of the magnetic disk (a magnetic disk of Example 1-1) were fabricated as above.

Also, similarly to the above except that the atmospheric temperature inside the housing during the ultraviolet irradiation was adjusted to the range of 90 to 140° C. (90° C. or more and 140° C. or less), 100 pieces of the magnetic disk (a magnetic disk of Example 1-2) were fabricated.

On the other hand, similarly to the above except that the atmospheric temperature inside the housing during the ultraviolet irradiation was adjusted to less than 50° C., 100 pieces of the magnetic disk (a magnetic disk of Comparative Example 1-1) were fabricated. Also, similarly to the above except that the atmospheric temperature was adjusted to higher than 180° C., 100 pieces of the magnetic disk (a magnetic disk of Comparative Example 1-2) were fabricated.

Subsequently, by means of the following test methods, each of the magnetic disks of Examples 1-1 to 1-2 and Comparative Examples 1-1 to 1-2 was evaluated.

(1) Glide Test

This test was conducted by using a glide testing machine provided with a glide head. The floating amount of the glide head was set to 5 nm, and those in which no defect was detected were accepted, while if even only one defect was detected, it was rejected.

(2) LUL Durability Test

The LUL-type HDD (5400-rpm rotation type) was prepared, and the magnetic head having the floating amount of 5 nm and the magnetic disk of the example were mounted. The slider of the magnetic head was a NPAB (negative pressure) slider, and a magneto-resistive effect-type element (GMR element) was mounted as a reproduction element. An FeNi permalloy alloy was used at a shield portion. By making this LUL-type HDD repeat a continuous LUL operation, the number of LUL times the magnetic disk endured until a failure occurred was measured. Under a usual HDD use environment, it is said to take approximately 10 years for the magnetic disk to exceed the number of the LUL times of 400 thousands, and endurance of 600 thousand LUL times is considered as favorable at present and thus, the magnetic disk which has endured 600 thousand LUL times was accepted.

The acceptance rates of the above glide test and the LUL durability test are illustrated in the following table 1.

TABLE 1

| | Atmospheric temperature in ultraviolet irradiation | Glide test acceptance rate (%) | LUL durability test acceptance rate (%) |
| --- | --- | --- | --- |
| Comparative Example 1-1 | Less than 50° C. | 40 | 10 (lubricant pickup) |
| Example 1-1 | 50 to 90° C. | 60 | 70 |
| Example 1-2 | 90 to 140° C. | 95 | 100 |
| Comparative Example 1-2 | Exceeding 180° C. | 30 | 0 (crush) |

From the result of Table 1, it was confirmed, according to the examples of the present invention in which the ultraviolet irradiation is conducted by adjusting the atmospheric temperature in the ultraviolet irradiation to 50 to 180° C., the acceptance rates of the glide test and the LUL durability test of (i.e. yields of) the magnetic disk can be improved.

Example 2

Comparative Example 2

Manufacture of the Lubricant

The lubricant compound in the above exemplification No. 5 was manufactured as follows.

The lubricant compound was manufactured by reacting the perfluoropolyether compound having a perfluoropolyether main chain in the molecule and having a hydroxyl group at the both ends with resorcinol diglycidylether under the alkaline condition (NaOH) (3 equivalent of the perfluoropolyether compound was reacted with resorcinol diglycidylether).

With respect to the lubricant made of the compound obtained as above, molecular weight fractionation was conducted as appropriate by means of the supercritical extraction method.

A film of the lubrication layer was formed similarly to Example 1 except that the lubricant manufactured as above (with Mn measured by using the NMR method of 3600 and the molecular weight dispersion degree of 1.10) made of the lubricant compound (the above exemplified compound No. 5) obtained by molecular weight fractionation through the supercritical extraction method was used, and after the film formation, the ultraviolet irradiation was conducted to the magnetic disk under the conditions similar to those in Example 1.

Then, each magnetic disk of Examples 2-1 to 2-2 and Comparative Examples 2-1 to 2-2 obtained by changing the atmospheric temperature during the ultraviolet irradiation similarly to Example 1 and Comparative Example 1 was evaluated similarly to Example 1.

The acceptance rates of the glide test and the LUL durability test of each magnetic disk are illustrated in the following Table 2.

TABLE 2

| | Atmospheric temperature in ultraviolet irradiation | Glide test acceptance rate (%) | LUL durability test acceptance rate (%) |
| --- | --- | --- | --- |
| Comparative Example 2-1 | Less than 50° C. | 45 | 15 (lubricant pickup) |
| Example 2-1 | 50 to 90° C. | 70 | 80 |
| Example 2-2 | 90 to 140° C. | 98 | 100 |
| Comparative Example 2-2 | Exceeding 180° C. | 35 | 10 (head contact mark) |

From the result of Table 2, it was confirmed, according to the examples of the present invention in which the ultraviolet irradiation is conducted by adjusting the atmospheric temperature in the ultraviolet irradiation to 50 to 180° C., the acceptance rates of the glide test and the LUL durability test of (i.e. yields of) the magnetic disk can be improved.

Example 3

Comparative Example 3

Manufacture of the Lubricant

The lubricant compound in the above exemplified compound B was manufactured as follows.

First, 2 equivalent of perfluoropolyether compound having the perfluoropolyether main chain in the molecule and having the hydroxyl group at the both ends was reacted with 1 equivalent of phenoxy 4-substitution of cyclophosphazene. Then, the 1 equivalent of compound obtained was reacted with phenoxy 5-substitution of cyclophosphazene so as to manufacture the exemplified lubricant compound B.

With respect to the lubricant made of the compound obtained as above, molecular weight fractionation was conducted as appropriate by means of the supercritical extraction method.

A film of the lubrication layer was formed similarly to Example 1 except that the lubricant manufactured as above (with Mn measured by using the NMR method of 6000 and the molecular weight dispersion degree of 1.20) made of the lubricant compound (the above exemplified compound B) obtained by molecular weight fractionation through the supercritical extraction method was used, and after the film formation, the ultraviolet irradiation was conducted to the magnetic disk under the conditions similar to those in Example 1 except that the atmospheric gas during the ultraviolet irradiation was changed from the nitrogen gas to argon gas.

Then, each magnetic disk of Examples 3-1 to 3-2 obtained by changing the atmospheric temperature during the ultraviolet irradiation similarly to Example 1 and Comparative Example 1, the magnetic disk (magnetic disk of Example 3-3) manufactured similarly to the above except that the atmospheric temperature inside the housing during the ultraviolet irradiation was adjusted to a range of 140 to 180° C. (exceeding 140° C. and 180° C. or less), and Comparative Example 3-1 was evaluated similarly to Example 1.

The acceptance rates of the glide test and the LUL durability test of each magnetic disk are illustrated in the following Table 3.

TABLE 3

| | Atmospheric temperature in ultraviolet irradiation | Glide test acceptance rate (%) | LUL durability test acceptance rate (%) |
|---|---|---|---|
| Comparative Example 3-1 | Less than 50° C. | 20 | 10 (lubricant pickup) |
| Example 3-1 | 50 to 90° C. | 50 | 60 |
| Example 3-2 | 90 to 140° C. | 85 | 100 |
| Example 3-3 | 140 to 180° C. | 60 | 70 |

From the result of Table 3, it was confirmed, according to the examples of the present invention in which the ultraviolet irradiation is conducted by adjusting the atmospheric temperature in the ultraviolet irradiation to 50 to 180° C., the acceptance rates of the glide test and the LUL durability test of (i.e. yields of) the magnetic disk can be improved.

The invention claimed is:

1. A manufacturing method of a magnetic disk in which at least a magnetic layer, a carbon protective layer, and a lubrication layer are sequentially formed on a substrate, comprising the steps of:
   forming a film of a lubricant composition containing a lubricant compound having a perfluoropolyether main chain in the molecular structure and also an aromatic group or a phosphazene ring on the carbon protective layer to form the lubrication layer; and then
   subjecting the magnetic disk to ultraviolet irradiation under a nitrogen gas or an inert gas atmosphere having no oxygen and under an atmospheric temperature to a range of 90 to 140° C.,
   wherein, in the subjecting step,
   a predetermined space region which contains the magnetic disk to be subjected to said ultraviolet irradiation is covered by a housing which is formed, at least on the ultraviolet irradiation side, of a transparent member transmitting the ultraviolet rays and while the nitrogen gas or the inert gas is made to flow into said housing, and the magnetic disk in the housing is subjected to the ultraviolet irradiation from the outside of said housing,
   wherein the atmospheric temperature inside the housing during the ultraviolet irradiation is adjusted to 90 to 140° C.,
   wherein the predetermined space region is 8000 cm$^3$ or less, and
   wherein the lubricant compound is represented by one of the following formulas:

[Formula 2]

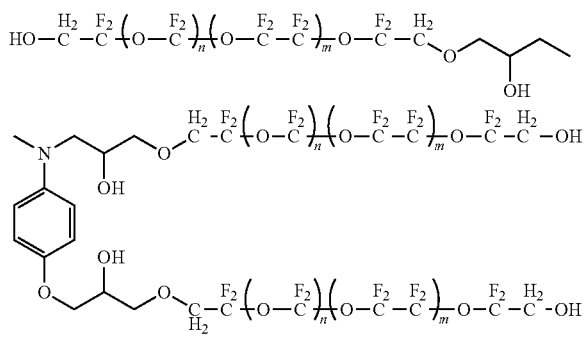

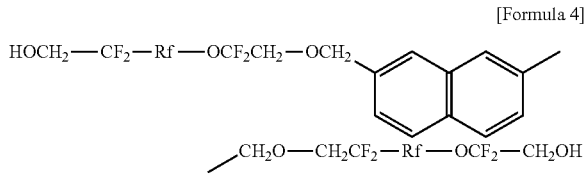

[Formula 4]

[Formula 5]

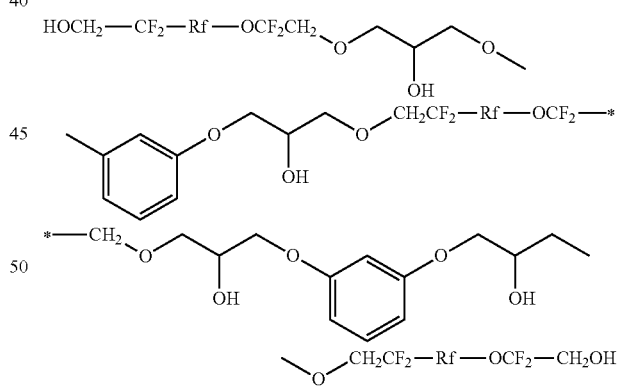

wherein Rf represents

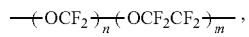

and m and n each represent an integer of not less than 1.

2. The manufacturing method of a magnetic disk according to claim 1, wherein a light source used for said ultraviolet irradiation includes a wavelength region at least in the vicinity of 185 nm.

3. The manufacturing method of a magnetic disk according to claim 1, wherein
said carbon protective layer is a film formed by a plasma CVD method.

4. The manufacturing method of a magnetic disk according to claim 1, wherein
said magnetic disk is a perpendicular magnetic recording disk mounted on a magnetic disk device whose start/stop mechanism is of a load-unload type.

5. The manufacturing method of a magnetic disk according to claim 1, wherein the gas pressure in the housing is adjusted to positive pressure.

6. The manufacturing method of a magnetic disk according to claim 1, wherein the predetermined space region is 4000 cm$^3$ or less.

* * * * *